US010558838B2

(12) United States Patent
Shen et al.

(10) Patent No.: US 10,558,838 B2
(45) Date of Patent: Feb. 11, 2020

(54) OPTIMIZED SCAN SEQUENCE FOR BIOMETRIC SENSOR

(71) Applicant: Synaptics Incorporated, San Jose, CA (US)

(72) Inventors: Guozhong Shen, San Jose, CA (US); Syed Mahmud, Dublin, CA (US); Jonathan Ku, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 15/977,717

(22) Filed: May 11, 2018

(65) Prior Publication Data
US 2019/0347464 A1 Nov. 14, 2019

(51) Int. Cl.
*G06K 9/28* (2006.01)
*G06K 9/36* (2006.01)
*G06K 9/00* (2006.01)

(52) U.S. Cl.
CPC ....... *G06K 9/00026* (2013.01); *G06K 9/0002* (2013.01); *G06K 9/00087* (2013.01)

(58) Field of Classification Search
CPC ............... G06K 9/0004; G06K 9/00006–0012
See application file for complete search history.

(56) References Cited

U.S. PATENT DOCUMENTS

| 6,125,192 | A | 9/2000 | Bjorn et al. |
| 2007/0253607 | A1 | 11/2007 | Higuchi |
| 2008/0267537 | A1 | 10/2008 | Thuries |
| 2014/0254895 | A1* | 9/2014 | Higuchi ............... A61B 5/1172 382/124 |
| 2015/0331508 | A1* | 11/2015 | Nho ...................... G06F 3/0421 345/173 |
| 2016/0247010 | A1* | 8/2016 | Huang ..................... G02B 5/20 |
| 2017/0270342 | A1 | 9/2017 | He et al. |
| 2017/0337413 | A1* | 11/2017 | Bhat .................... G06K 9/0002 |
| 2018/0129798 | A1* | 5/2018 | He ..................... G06K 9/00013 |
| 2019/0034020 | A1* | 1/2019 | He ...................... G02F 1/13338 |

* cited by examiner

*Primary Examiner* — Brian Werner
(74) *Attorney, Agent, or Firm* — Leydig, Voit & Mayer, Ltd.

(57) ABSTRACT

Disclosed are systems and method for imaging an input object. An imaging device includes: a light source that emanates light to a sensing region in which the input object to be imaged is placed; a collimator filter layer; an image sensor array disposed below the collimator filter layer that blocks some light reflected from the input object while other light passes through apertures in the collimator filter layer and arrives at the image sensor array; and a controller configured to cause a first image of the input object to be captured with the light source turned on, and to transmit the first image to a processor associated with the electronic device to perform image matching against one or more template images before causing a second image of the input object to be captured with the light source turned off.

20 Claims, 10 Drawing Sheets

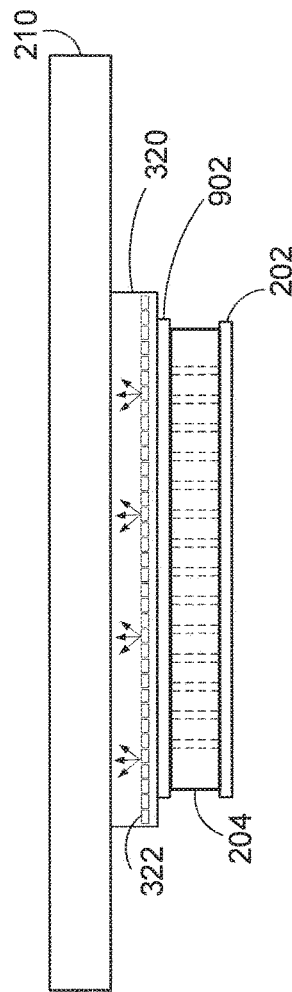
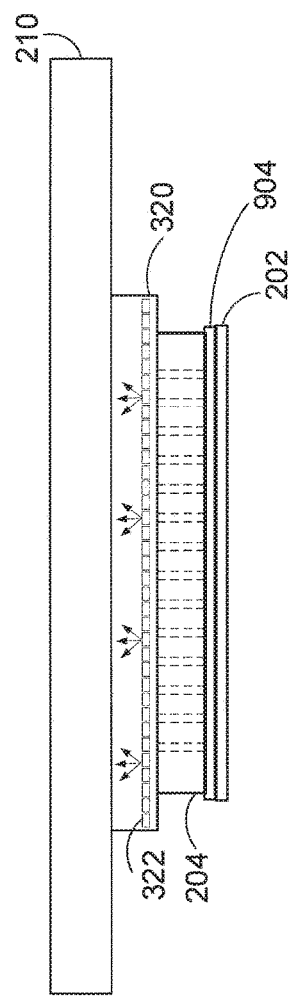
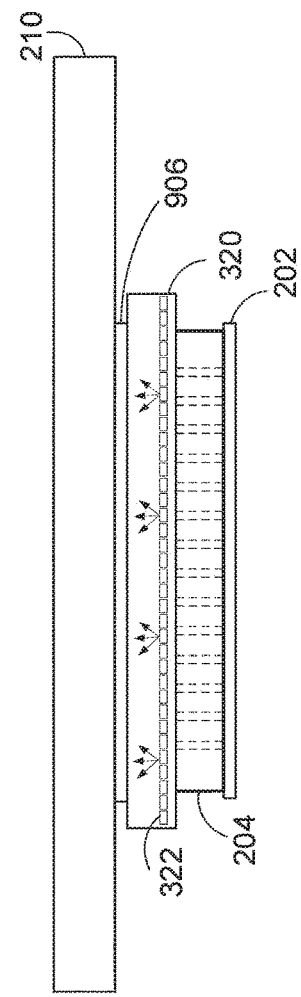

OPTIMIZED SCAN SEQUENCE FOR BIOMETRIC SENSOR

FIELD

This disclosure generally relates to sensors and, more particularly, to an optimized scan sequence for a biometric sensor.

BACKGROUND

Object imaging is useful in a variety of applications. By way of example, biometric recognition systems image biometric objects for authenticating and/or verifying users of devices incorporating the biometric recognition systems. Biometric imaging provides a reliable, non-intrusive way to verify individual identity for recognition purposes. Various types of sensors may be used for biometric imaging.

Fingerprints are an example of a biometric object that may be imaged. Fingerprints, like various other biometric characteristics, are based on distinctive personal characteristics and thus provide a reliable mechanism to recognize an individual. Thus, fingerprint sensors have many potential applications. For example, fingerprint sensors may be used to provide access control in stationary applications, such as security checkpoints. Fingerprint sensors may also be used to provide access control in mobile devices, such as cell phones, wearable smart devices (e.g., smart watches and activity trackers), tablet computers, personal data assistants (PDAs), navigation devices, and portable gaming devices. Accordingly, some applications, in particular applications related to mobile devices, may require recognition systems that are both small in size and highly reliable.

Fingerprint sensors in many mobile devices are capacitive sensors having a capacitive sensing array configured to sense ridge and valley features of a fingerprint. Typically, these fingerprint sensors either detect absolute capacitance (sometimes known as "self-capacitance") or trans-capacitance (sometimes known as "mutual capacitance"). In either case, capacitance at each sensing element in the array varies depending on whether a ridge or valley is present, and these variations are electrically detected to form an image of the fingerprint.

While capacitive fingerprint sensors provide certain advantages, many commercially available capacitive fingerprint sensors have difficulty sensing fine ridge and valley features through large distances, requiring the fingerprint to contact a sensing surface that is close to the sensing array. It remains a significant challenge for a capacitive sensor to detect fingerprints through thick layers, such as the thick cover glass (sometimes referred to herein as a "cover lens" or "cover layer") that protects the display of many smart phones and other mobile devices. To address this issue, a cutout is often formed in the cover glass in an area beside the display, and a discrete capacitive fingerprint sensor (often integrated with a button) is placed in the cutout area so that it can detect fingerprints without having to sense through the cover glass. The need for a cutout makes it difficult to form a flush surface on the face of device, detracting from the user experience, and complicating the manufacture. The existence of mechanical buttons also takes up valuable device real estate.

Optical sensors provide an alternative to capacitive sensors. Acoustic (e.g., ultrasound) sensors also provide an alternative to capacitive sensors. Such sensors may be integrated within the display of an electronic device. However, optical sensors are susceptible to certain drawbacks, such as longer latency and lack of a consistent baseline, e.g., as a result of varying lighting environments at the time of sensing.

SUMMARY

One embodiment provides an imaging device included in an electronic device for imaging an input object. The imaging device comprises: a light source that emanates light to a sensing region in which the input object to be imaged is placed; a collimator filter layer; an image sensor array disposed below the collimator filter layer, wherein the collimator filter layer blocks some light reflected from the input object while other light reflected from the input object passes through apertures in the collimator filter layer and arrives at the image sensor array; and a controller configured to cause a first image of the input object to be captured with the light source turned on, and to transmit the first image to a processor associated with the electronic device to perform image matching against one or more template images before causing a second image of the input object to be captured with the light source turned off.

Another embodiment provides a method for imaging an input object. The method comprises: determining that the input object has settled in a sensing region associated with an electronic device; causing a first image of the input object to be captured with a light source turned on, wherein light emanating from the light source is reflected from the input object, and wherein some light reflected from the input object is blocked by a collimator filter layer while other light reflected from the input object passes through apertures in the collimator filter layer and arrives at an image sensor array that captures the first image of the input object, and transmitting the first image to a processor associated with the electronic device to perform image matching against one or more template images before causing a second image of the input object to be captured with the light source turned off.

Another embodiment provides a non-transitory computer-readable storage medium storing instructions that, when executed by a processor, cause an electronic device to image an input object, by performing the steps of: determining that the input object has settled in a sensing region associated with the electronic device; causing a first image of the input object to be captured with a light source turned on, wherein light emanating from the light source is reflected from the input object, and wherein some light reflected from the input object is blocked by a collimator filter layer while other light reflected from the input object passes through apertures in the collimator filter layer and arrives at an image sensor array that captures the first image of the input object; and transmitting the first image to a processor associated with the electronic device to perform image matching against one or more template images before causing a second image of the input object to be captured with the light source turned off.

BRIEF DESCRIPTION OF THE DRAWINGS

FIGS. 9A-9C are example stack-ups of a sensor including a coarse sensor array, according to various embodiments.

DETAILED DESCRIPTION

Figure 1:
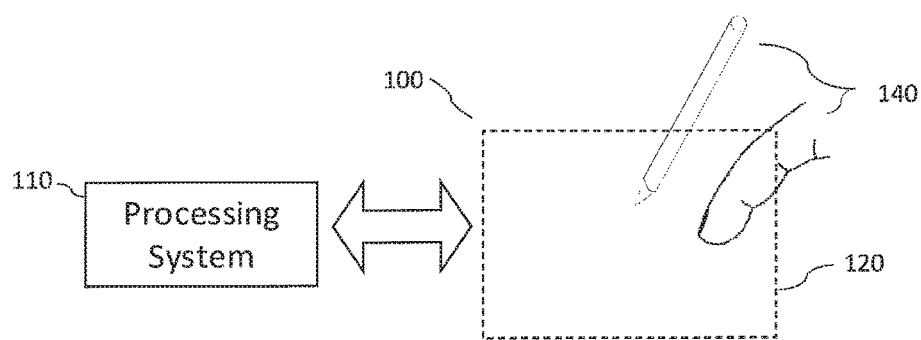
FIG. 1 is a block diagram of an example of a system that includes an image sensor and a processing system.

The following detailed description is exemplary in nature and is not intended to limit the disclosure or the application and uses of the disclosure. Furthermore, there is no intention to be bound by any expressed or implied theory presented in the preceding technical field, background, summary, brief description of the drawings, or the following detailed description.

As described in greater detail herein, the disclosed embodiments provide systems and methods for an optimized scan sequence for a biometric sensor.

As described above, existing optical sensors suffer from certain limitations. In some cases, optical sensors tend to have longer latency than capacitive sensors. This longer latency can be a result of two related factors. First, a baseline imaging level is not constant in optical sensing, as it is in capacitive sensing. In optical fingerprint sensing, for example, the amount of light passing through a finger depends on the environment. The amount of light passing through a finger when sensing in direct sunlight would typically be more than the amount of light passing through the finger when sensing in a dark room. For this reason, conventional optical sensing techniques first capture a baseline image with an optical sensing light source (e.g., LED or display screen light source) turned off, which provides information about the amount of light present in the environment. Then, a second image is captured with the optical sensing light source turned on. The baseline image is subtracted from the second image, and the result is used for fingerprint verification (e.g., by comparing the result to one or more prior enrollment images). As can be understood, the process of first capturing a baseline image and then capturing a second image inherently adds latency, since two separate images are captured. Capacitive sensors, on the other hand, can achieve a usable image after just capturing one image, since the baseline levels are predetermined for capacitive sensing.

Second, another drawback of existing optical sensing techniques that adds latency is that it typically takes one frame to reset the sensor circuitry, and then a second frame to capture an image, thus taking two frames to capture one image. This is the case for both thin film transistor (TFT) and complementary metal-oxide-semiconductor (CMOS) optical sensors.

Therefore, conventional optical sensing systems typically take at least four frames to capture a usable fingerprint image: at least two frames to capture the baseline image, and at least two frames to capture the second image from which the baseline image is subtracted. A still further drawback of conventional optical sensors is that during the first capture (i.e., capturing the baseline image), the finger may not be stable yet, so even more frames are usually captured to increase the likelihood that the finger is settled. Attempting to image a finger that has not settled typically results in blurry or unusable images.

The disclosed embodiments provide an optical sensing scan sequence that mitigates the drawbacks described above with conventional optical sensing techniques. As described in greater detail herein, the disclosed embodiments provide a scan sequence that first determines whether a finger is settled. Once it is determined that the finger has settled, a first image of the finger is captured with an optical sensing light source (e.g., LED or display screen light source) turned on. The first image is then transmitted to an application processor (e.g., host processor) to perform image matching, e.g., against a template or stored image. A second (baseline) image is then captured with the optical sensing light source turned off after the first image is captured with the optical sensing light source turned on. The second image can be captured in parallel with the host processor performing image matching using the first image. As such, the host processor is performing image matching without waiting for the baseline image to be received.

If the host processor determines there is a match based on the first image, then the matching process terminates, as positive match is found. However, if the host processor determines there is not a match based on the first image, the second image captured with the optical sensing light source turned off is transmitted to the host processor. The host processor subtracts the second image from the first image. The resultant delta image is then used to perform image matching.

As such, in the disclosed scan sequence, the second image is not needed if a match can be found based on the first image alone. As such, latency is improved since the system does not need to wait for the second image to be captured to begin the match verification process. In some implementations, the second image may be used in very bright lighting environments (e.g., direct sunlight), but may not be necessary to find a match is most other lighting environments.

Turning to the drawings, FIG. 1 is a block diagram of an exemplary sensing system having a sensor 100, in accordance with certain embodiments. The sensor 100 may be configured to provide input to an electronic system (also "electronic device"). Some non-limiting examples of electronic systems include personal computers of all sizes and shapes, such as desktop computers, laptop computers, netbook computers, tablets, e-book readers, personal digital assistants (PDAs), and wearable computers (such as smart watches and activity tracker devices). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The sensor 100 can be implemented as a physical part of the electronic system, or can be physically separate from the electronic system. The sensor 100 may be integrated as part of a display of an electronic device. As appropriate, the sensor 100 may communicate with parts of the electronic system using any one or more of the following: buses, networks, and other wired or wireless interconnections. Examples include I2C, SPI, PS/2, Universal Serial Bus (USB), Bluetooth, RF, and IRDA.

The sensor 100 is configured to sense input provided by one or more input objects 140 in a sensing region 120. In one embodiment, the input object 140 is a finger, and the sensor 100 is implemented as a fingerprint sensor (also "fingerprint scanner") configured to detect fingerprint features of the input object 140. In other embodiments, the sensor 100 may be implemented as vascular sensor (e.g., for finger vein recognition), hand geometry sensor, or a proximity sensor (such as a touch pad, touch screen, and or other touch sensor device). In other embodiments, the sensor may be used for heart rate detection by monitoring dynamic changes in reflectance of the image.

Sensing region 120 encompasses any space above, around, in, and/or near the sensor 100 in which the sensor 100 is able to detect input (e.g., user input provided by one or more input objects 140). The sizes, shapes, and locations of particular sensing regions may vary widely from embodiment to embodiment. In some embodiments, the sensing region 120 extends from a surface of the sensor 100 in one or more directions into space. In various embodiments, input surfaces may be provided by surfaces of casings within which sensor elements reside, by face sheets applied over the sensor elements or any casings, etc. In some embodiments, the sensing region 120 has a rectangular shape when projected onto an input surface of the input device 100.

The sensor 100 may utilize any combination of sensor components and sensing technologies to detect user input in the sensing region 120. The sensor 100 comprises one or more detector elements (or "sensing elements") for detecting user input. Some implementations utilize arrays or other regular or irregular patterns of sensing elements to detect the input object 140.

In the optical implementations of the input device 100 set forth herein, one or more detector elements (also referred to as optical sensing elements) detect light from the sensing region. In various embodiments, the detected light may be reflected from input objects in the sensing region, emitted by input objects in the sensing region, or some combination thereof. Example optical detector elements include photodiodes, CMOS arrays, CCD arrays, and other types of photosensors configured to detect light in the visible or invisible spectrum (such as infrared or ultraviolet light). The photosensors may be thin film photodetectors, such as thin film transistors (TFTs) or thin film diodes.

Some optical implementations provide illumination to the sensing region. Reflections from the sensing region in one or more illumination wavelengths are detected to determine input information corresponding to the input object.

Some optical implementations rely on principles of direct illumination of the input object, which may or may not be in contact with an input surface of the sensing region depending on the configuration. One or more light sources and/or light guiding structures may be used to direct light to the sensing region. When an input object is present, this light is reflected from surfaces of the input object, which reflections can be detected by the optical sensing elements and used to determine information about the input object.

Some optical implementations rely on principles of internal reflection to detect input objects in contact with the input surface of the sensing region. One or more light sources may be used to direct light in a transmitting medium at an angle at which it is internally reflected at the input surface of the sensing region, due to different refractive indices at opposing sides of the boundary defined by the sensing surface. Contact of the input surface by the input object causes the refractive index to change across this boundary, which alters the internal reflection characteristics at the input surface. Higher contrast signals can often be achieved if principles of frustrated total internal reflection (FTIR) are used to detect the input object. In such embodiments, the light may be directed to the input surface at an angle of incidence at which it is totally internally reflected, except where the input object is in contact with the input surface and causes the light to partially transmit across this interface. An example of this is presence of a finger introduced to an input surface defined by a glass to air interface. The higher refractive index of human skin compared to air causes light incident at the input surface at the critical angle of the interface to air to be partially transmitted through the finger, where it would otherwise be totally internally reflected at the glass to air interface. This optical response can be detected by the system and used to determine spatial information. In some embodiments, this can be used to image small scale fingerprint features, where the internal reflectivity of the incident light differs depending on whether a ridge or valley is in contact with that portion of the input surface.

Sensors other than optical sensors may also be used. For example, in some embodiments, the sensor 100 is an acoustic sensor, such as an ultrasound sensor having ultrasound sensing elements.

Some implementations are configured to provide images that span one, two, three, or higher dimensional spaces. The input device may have a sensor resolution that varies from embodiment to embodiment depending on factors such as the particular sensing technology involved and/or the scale of information of interest. For example, some biometric sensing implementations may be configured to detect physiological features of the input object (such as fingerprint ridge features of a finger, or blood vessel patterns of an eye), which may utilize higher sensor resolutions and present different technical considerations from some proximity sensor implementations that are configured to detect a position of the input object with respect to the sensing region (such as a touch position of a finger with respect to an input surface). In some embodiments, the sensor resolution is determined by the physical arrangement of an array of sensing elements, where smaller sensing elements and/or a smaller pitch can be used to define a higher sensor resolution.

In some embodiments, the sensor 100 is implemented as a fingerprint sensor having a sensor resolution high enough to capture features of a fingerprint. In some implementations, the fingerprint sensor has a resolution sufficient to capture minutia (including ridge endings and bifurcations), orientation fields (sometimes referred to as "ridge flows"), and/or ridge skeletons. These are sometimes referred to as level 1 and level 2 features, and in an exemplary embodiment, a resolution of at least 250 pixels per inch (ppi) is capable of reliably capturing these features. In some implementations, the fingerprint sensor has a resolution sufficient to capture higher level features, such as sweat pores or edge contours (i.e., shapes of the edges of individual ridges). These are sometimes referred to as level 3 features, and in an exemplary embodiment, a resolution of at least 750 pixels per inch (ppi) is capable of reliably capturing these higher level features.

In some embodiments, the fingerprint sensor is implemented as a placement sensor (also "area" sensor or "static" sensor) or a swipe sensor (also "slide" sensor or "sweep"

sensor). In a placement sensor implementation, the sensor is configured to capture a fingerprint input as the user's finger is held stationary over the sensing region. Typically, the placement sensor includes a two dimensional array of sensing elements capable of capturing a desired area of the fingerprint in a single frame. In a swipe sensor implementation, the sensor is configured to capture to a fingerprint input based on relative movement between the user's finger and the sensing region. Typically, the swipe sensor includes a linear array or a thin two-dimensional array of sensing elements configured to capture multiple frames as the user's finger is swiped over the sensing region. The multiple frames may then be reconstructed to form an image of the fingerprint corresponding to the fingerprint input. In some implementations, the sensor is configured to capture both placement and swipe inputs.

In some embodiments, the fingerprint sensor is configured to capture less than a full area of a user's fingerprint in a single user input (referred to herein as a "partial" fingerprint sensor). Typically, the resulting partial area of the fingerprint captured by the partial fingerprint sensor is sufficient for the system to perform fingerprint matching from a single user input of the fingerprint (e.g., a single finger placement or a single finger swipe). Some example imaging areas for partial placement sensors include an imaging area of 100 $mm^2$ or less. In another exemplary embodiment, a partial placement sensor has an imaging area in the range of 10-50 $mm^2$. In some implementations, the partial fingerprint sensor has an input surface that is the same size as the imaging area.

While the input device is generally described in the context of a fingerprint sensor in FIG. 1, embodiments include other biometric sensor devices. In various embodiments, a biometric sensor device may be configured to capture physiological biometric characteristics of a user. Some example physiological biometric characteristics include fingerprint patterns, vascular patterns (sometimes known as "vein patterns"), palm prints, and hand geometry.

In FIG. 1, a processing system 110 is shown in communication with the input device 100. The processing system 110 comprises parts of or all of one or more integrated circuits (ICs) including microprocessors, microcontrollers and the like and/or other circuitry components. In some embodiments, the processing system may be configured to operate hardware of the input device to capture input data, and/or implement a biometric process or other process based on input data captured by the sensor 100.

In some implementations, the processing system 110 is configured to operate sensor hardware of the sensor 100 to detect input in the sensing region 120. In some implementations, the processing system comprises driver circuitry configured to drive signals with sensing hardware of the input device and/or receiver circuitry configured to receive signals with the sensing hardware. For example, a processing system for an optical sensor device may comprise driver circuitry configured to drive illumination signals to one or more LEDs, an LCD backlight or other light sources, and/or receiver circuitry configured to receive signals with optical receiving elements.

In some embodiments, the processing system 110 comprises electronically-readable instructions, such as firmware code, software code, and/or the like. In some embodiments, the processing system 110 includes memory (computer-readable storage medium) for storing electronically-readable instructions and/or other data, such as reference templates for biometric recognition. The processing system 110 can be implemented as a physical part of the sensor 100, or can be physically separate from the sensor 100. The processing system 110 may communicate with parts of the sensor 100 using buses, networks, and/or other wired or wireless interconnections. In some embodiments, components composing the processing system 110 are located together, such as near sensing element(s) of the sensor 100. In other embodiments, components of processing system 110 are physically separate with one or more components close to sensing element(s) of sensor 100, and one or more components elsewhere. For example, the sensor 100 may be a peripheral coupled to a computing device, and the processing system 110 may comprise software configured to run on a central processing unit of the computing device and one or more ICs (perhaps with associated firmware) separate from the central processing unit. As another example, the sensor 100 may be physically integrated in a mobile device, and the processing system 110 may comprise circuits and/or firmware that are part of a central processing unit or other main processor of the mobile device. In some embodiments, the processing system 110 is dedicated to implementing the sensor 100. In other embodiments, the processing system 110 performs functions associated with the sensor and also performs other functions, such as operating display screens, driving haptic actuators, running an operating system (OS) for the electronic system, etc.

The processing system 110 may be implemented as a set of modules (hardware or software) that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes. In one or more embodiments, a first and second module may be comprised in separate integrated circuits. For example, a first module may be comprised at least partially within a first integrated circuit and a separate module may be comprised at least partially within a second integrated circuit. Further, portions of a single module may span multiple integrated circuits.

In some embodiments, the processing system 110 responds to user input (or lack of user input) in the sensing region 120 directly by causing one or more actions. Example actions include unlocking a device or otherwise changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the sensor 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, authenticate a user, and the like.

In some embodiments, the sensing region 120 of the sensor 100 overlaps at least part of an active area of a display screen, such as embodiments where the sensor 100 comprises a touch screen interface and/or biometric sensing embodiments configured to detect biometric input data over the active display area. For example, the sensor 100 may comprise substantially transparent sensor electrodes. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The display screen may also be flexible or rigid, and may be flat, curved, or have other geometries. In some embodiments, the display screen includes a glass or plastic substrate for TFT circuitry and/or other circuitry, which may be used to provide visuals and/or provide other functionality. In some embodiments, the display device includes a cover lens (sometimes referred to as a "cover glass") disposed above display circuitry which may also provide an input surface for the input device. Example cover lens materials include plastic, optically clear amorphous solids, such as chemically hardened glass, as well as optically clear crystalline structures, such as sapphire. In accordance with the disclosure, the sensor 100 and the display screen may share physical elements. For example, some embodiments may utilize some of the same electrical components for displaying visuals and for input sensing. In one embodiment, one or more display electrodes of a display device may be configured for both display updating and input sensing. As another example, the display screen may be operated in part or in total by the processing system 110 in communication with the input device. In some embodiments, light from the display may be used as the light source to perform optical sensing.

Figure 2:
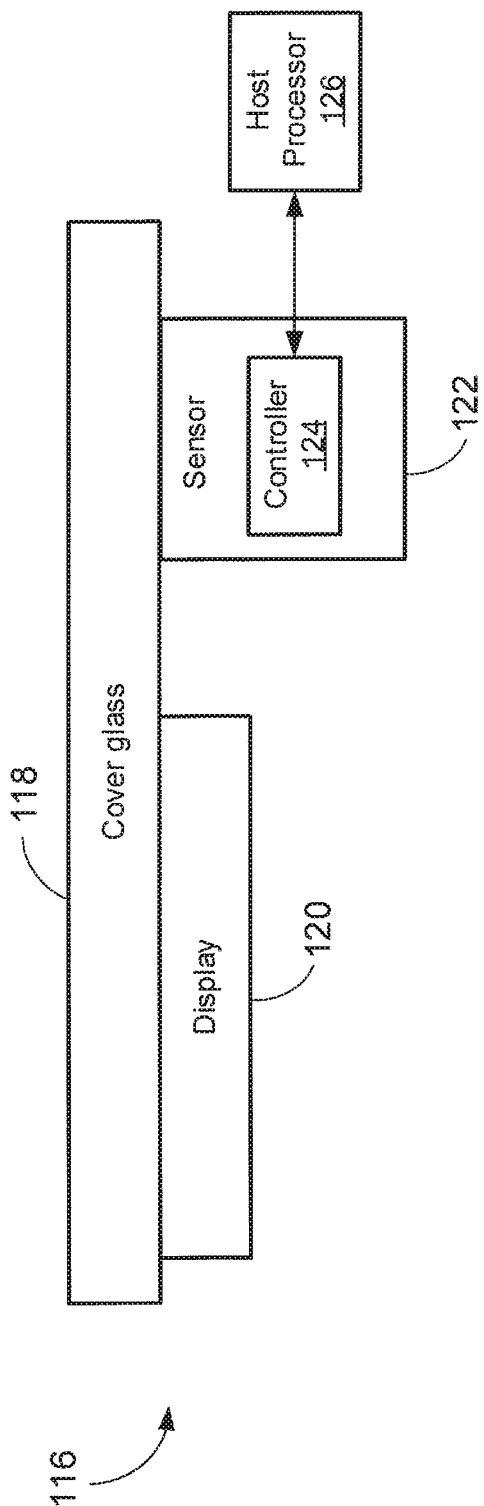
FIG. 2 illustrates an example of a device that includes an optical sensor according to an embodiment of the disclosure.

FIG. 2 illustrates an example of an electronic device 116, such as a mobile phone, which includes cover glass 118 over a display 120. The disclosed method and system may be implemented by using the display 120 as the optical sensor to image an input object. Alternatively, a separate discrete component, e.g., sensor 122, provides the optical sensing capabilities. A discrete sensor may provide more flexibility in designing the optical components of the sensor for optimum illumination and/or signal conditioning than when attempting to integrate the optical sensor components on a display substrate, such as a TFT backplane. As also shown in the embodiment in FIG. 2, the sensor 122 includes a controller 124, which may be a processor or microprocessor. The controller 124 of the sensor is in communication with a host processor 126, such as an application processor or a main processor of the electronic device 116, e.g., a phone. Each of the controller 124 and host processor 126 may be implemented as one or more individual processors.

Figure 3A:
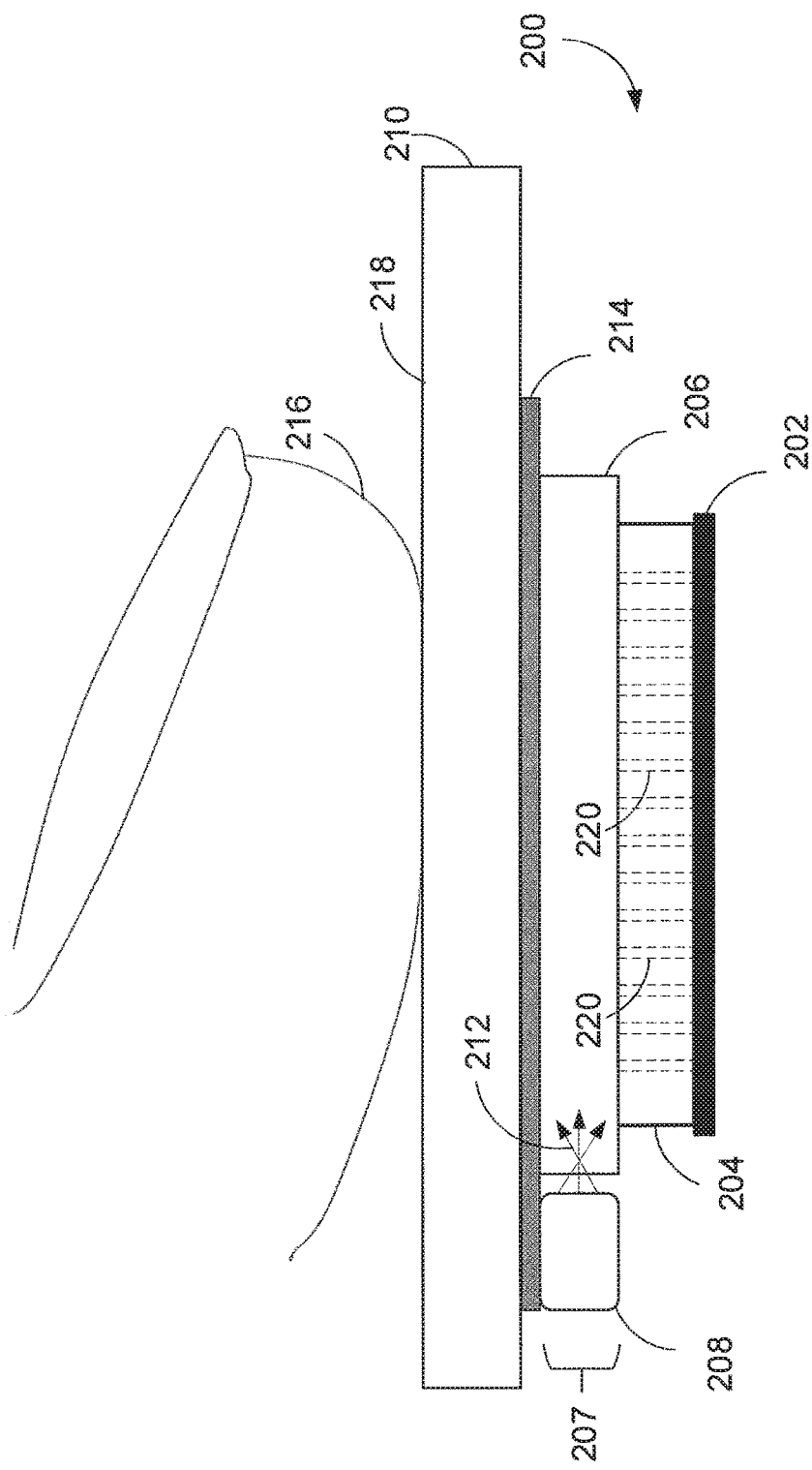
FIGS. 3A-3B illustrate examples of an optical sensor with a collimator filter layer according to an embodiment of the disclosure.

FIG. 3A illustrates an example of a stack-up for an optical image sensor device 200 used to image an object 216, such as a fingerprint. The sensor 200 includes an image sensor array 202, a collimator filter layer or light conditioning layer 204 disposed above the image sensor array 202, an illumination layer 207 disposed above the collimator filter layer 204, a light source 208, and a cover layer 210. In certain embodiments, a blocking layer 214 may also be provided.

The cover layer 210 protects the inner components of the sensor 200 such as the image sensor array 202. The cover layer 210 may include a cover glass or cover lens that protects inner components of a display in addition to the sensor 200. A sensing region for the input object is defined above the cover layer 210. A sensing surface 218 (i.e., top surface) of the cover layer 210 may form a sensing surface, which provides a contact area for the input object 216 (e.g., fingerprint). The cover layer 210 is made of any material such as glass, transparent polymeric materials and the like.

Although generally described in the context of fingerprint for illustrative purposes, the input object 216 is any object to be imaged. Generally, the object 216 will have various features. By way of example, the object 216 has ridges and valleys. Due to their protruding nature, the ridges contact the sensing surface 218 of the cover 210 layer. In contrast, the valleys do not contact the sensing surface 218 and instead form an air gap between the input object 216 and the sensing surface 218. The object 216 may have other features such as stain, ink and the like that do not create significant structural differences in portions of the input object 216, but which affect its optical properties. The methods and systems disclosed herein are suitable for imaging such structural and non-structural features of the input object 216.

The illumination layer 207 includes a light source 208 and/or a light guiding element 206 that directs illumination to the sensing region in order to image the input object. As shown in FIG. 3A, the light source 208 transmits beams or rays of light 212 into the light guiding element 206 and the transmitted light propagates through the light guiding element 206. The light guiding element may utilize total internal reflection, or may include reflecting surfaces that extract light up towards the sensing region. Some of the light in the illumination layer may become incident at the sensing surface 218 in an area that is contact with the input object 216. The incident light is in turn reflected back towards the collimator filter layer 204. In the example shown, the light source 208 is disposed adjacent to the light guiding element 206. However, it will be understood that the light source 208 may be positioned anywhere within the sensor 200 provided that emitted light reaches the light guiding element 206. For example, the light source 208 may be disposed below the image sensor array 202. Moreover, it will be understood that a separate light guiding element 206 is not required. For example, the light transmitted from the light source 208 can be transmitted directly into the cover layer 210 in which case the cover layer 210 also serves as the light guiding element. As another example, the light transmitted from the light source 208 can be transmitted directly to the sensing region, in which case the light source 208 itself serves as the illumination layer.

The light provided by the illumination layer 207 to image the object 216 may be in near infrared (NIR) or visible. The light can have a narrow band of wavelengths, a broad band of wavelengths, or operate in several bands.

The image sensor array 202 detects light passing through the collimator filter layer 204. Examples of suitable sensor arrays are complementary metal oxide semiconductor (CMOS) and charge coupled device (CCD) sensor arrays. The sensor array 202 includes a plurality of individual optical sensing elements capable of detecting the intensity of incident light.

To achieve optical sensing of fingerprints and fingerprint-sized features through thicker cover layers 210, light reflected from the fingerprint is conditioned by the light collimator filter layer 204 so that the light reaching a sensing element in the image sensor array 202 comes only from a small spot on the input object 216 directly above the sensor element. In the absence of such conditioning, any light arriving at a sensing element from a region on the object far away from the optical sensing elements contributes to image blurring.

To condition the light in accordance with the disclosure, the collimator filter layer 204 is provided with an array of apertures, or collimator holes, 220 with each aperture being directly above one or more optical sensing elements on the image sensor array 202. The apertures 220 are formed using any suitable technique, such as laser drilling, etching and the like.

The collimator filter layer 204 only allows light rays reflected from the input object 216 (e.g., finger) at normal or near normal incidence to the collimator filter layer 204 to pass and reach the optical sensing elements of the image sensor array 204. In one embodiment, the collimator filter layer 204 is an opaque layer with array of holes 220. The collimator filter layer 204 is laminated, stacked, or built directly above the image sensor array 202. By way of example, the collimator filter layer 204 may be made of a plastic material such as polycarbonate, PET, polyimide, carbon black, inorganic insulating or metallic materials, silicon, or SU-8. In certain embodiments, the collimator filter layer 204 is monolithic.

Also shown in FIG. 3A is blocking layer 214, which is optionally provided as part of optical sensor 200. The blocking layer 214 is a semitransparent or opaque layer that may be disposed above the collimator filter layer 204. By way of example, the blocking layer may be disposed between the cover layer 210 and the illumination layer 207, as shown in FIG. 3A. Alternatively, the blocking layer 214 may be disposed between the illumination layer 207 and the collimator filter layer 204. In either case, the blocking layer 214 obscures components of the sensor 200, such as the apertures in the collimator filter layer, from ambient light illumination, while still allowing the sensor 200 to operate. The blocking layer 214 may include of a number of different materials or sub-layers. For example, a thin metal or electron conducting layer may be used where the layer thickness is less than the skin depth of light penetration in the visible spectrum. Alternately, the blocking layer 214 may include a dye and/or pigment or several dyes and/or pigments that absorb light, for example, in the visible spectrum. As yet another alternative, the blocking layer 214 may include several sub-layers or nano-sized features designed to cause interference with certain wavelengths, such as visible light for example, so as to selectively absorb or reflect different wavelengths of light. The light absorption profile of the blocking layer 214 may be formulated to give a particular appearance of color, texture, or reflective quality thereby allowing for particular aesthetic matching or contrasting with the device into which the optical sensor 200 is integrated. If visible illumination wavelengths are used, a semitransparent layer may be used to allow sufficient light to pass through the blocking layer to the sensing region, while still sufficiently obscuring components below.

Figure 3B:
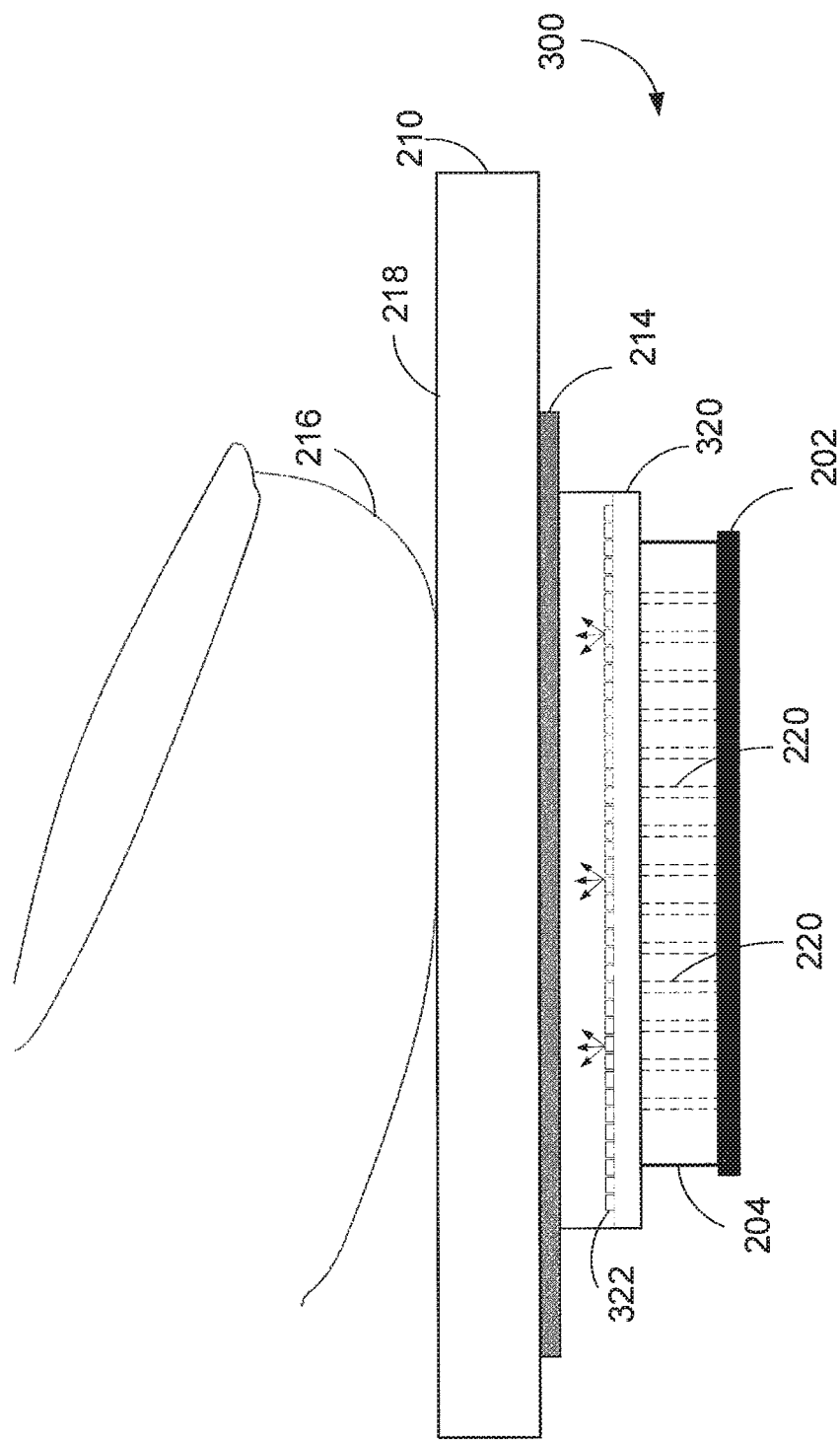

FIG. 3B illustrates another example of a stack-up for an optical image sensor device 300 used to image an object 216, such as a fingerprint. The sensor 300 includes an image sensor array 202, a collimator filter layer or light conditioning layer 204 disposed above the image sensor array 202, a display layer 320 disposed above the collimator filter layer 204, and a cover layer 210. In some embodiments, a blocking layer 214 may also be provided, but may be optional. As shown in FIG. 3B, a discrete light source is not required, as the light from the display layer 320 can be used to illuminate the object 216 (e.g., finger).

The display layer 320 may comprise the display screen of an electronic device and may include a plurality of light sources 322. The display layer 320 may be any type of dynamic display capable of displaying a visual interface to a user, and may include any type of light sources 322, such as emitting diodes (LEDs), organic LEDs (OLEDs), cathode ray tube (CRT), liquid crystal display (LCD), plasma, electroluminescence (EL), or other display technology. The display layer 320 may also be flexible or rigid, and may be flat, curved, or have other geometries. In some embodiments, the display layer 320 includes a glass or plastic substrate for TFT circuitry and/or other circuitry, which may be used to provide visuals and/or provide other functionality. The cover layer 210 is disposed above display layer 320 and may also provide a sensing surface 218 for the object 216. Example cover layer 210 materials include plastic, optically clear amorphous solids, such as chemically hardened glass, as well as optically clear crystalline structures, such as sapphire.

To achieve optical sensing of fingerprints and fingerprint-sized features through thicker cover layers 210, light emitted by the light sources 322 of the display layer 320 reflected from the fingerprint is conditioned by the light collimator filter layer 204 so that the light reaching a sensing element in the image sensor array 202 comes only from a small spot on the input object 216 directly above the sensor element. In the absence of such conditioning, any light arriving at a sensing element from a region on the object far away from the optical sensing elements contributes to image blurring.

Figure 4:
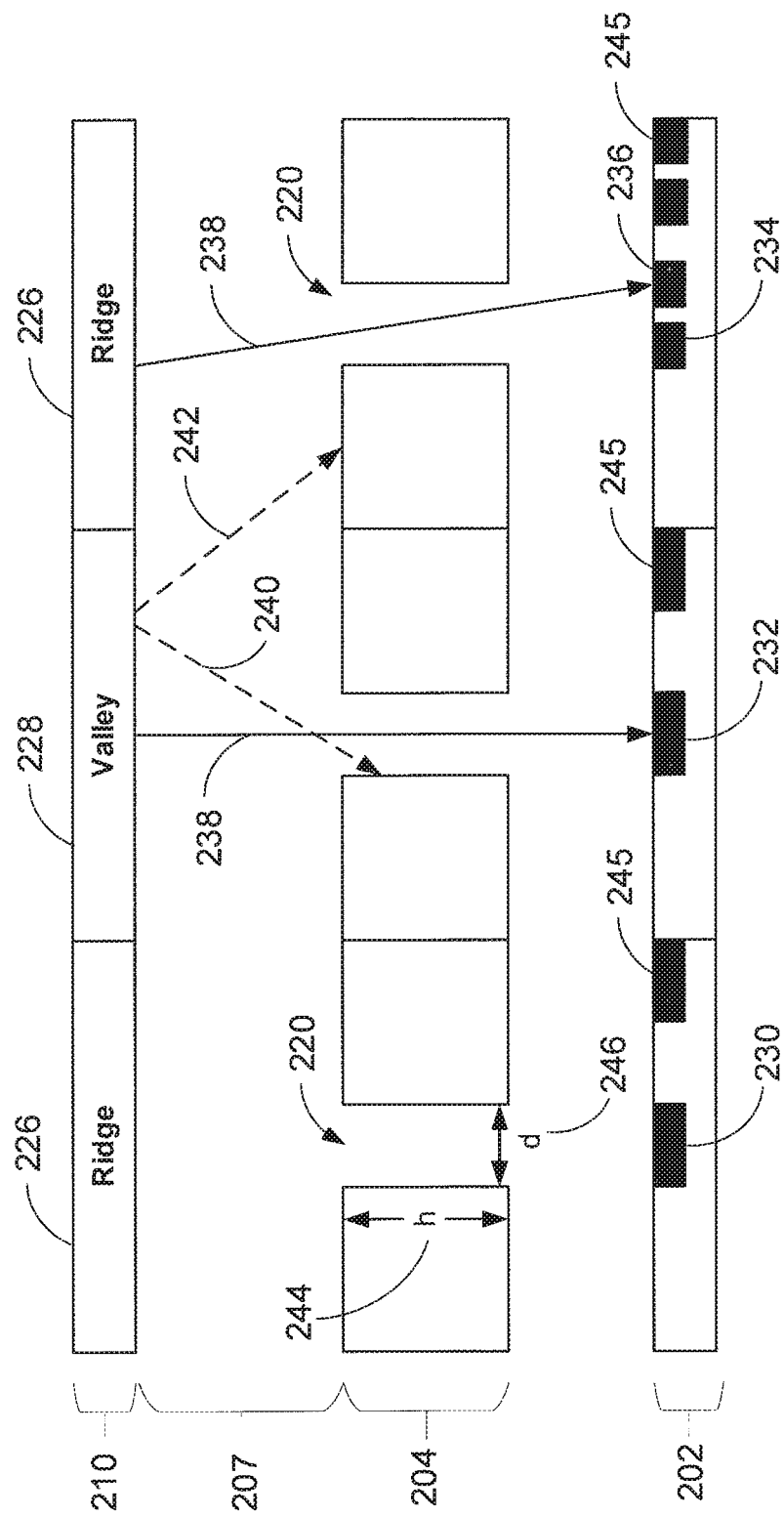
FIG. 4 illustrates an example of light interacting with an optical sensor having a collimator filter layer according to an embodiment of the disclosure.

FIG. 4 illustrates a closer view of the collimator filter layer 204 disposed between the illumination layer 207 and the image sensor array 202, and interaction of light within the sensor device 200. Portions 226 of the cover layer 210 are in contact with ridges of the input object 216 and portion 228 of the cover layer 210 is in contact with air due to the presence of a valley of object 216. Image sensor array 202 includes optical sensing elements 230, 232, 234 and 236 disposed below apertures or holes 220 of the collimator filter layer 204.

Illustratively shown are a series of light rays reflected at the cover layer 210. For example, light rays 238 reflect from the cover layer 210 at portions occupied by ridges or valleys of the object 216. Because the light rays 238 are above collimator apertures 220 and are relatively near normal, the light rays 238 pass through the apertures 220 in the collimator filter layer 204 and become incident on optical sensing elements 232 and 236, for example. The optical sensing elements can then be used to measure the intensity of light and convert the measured intensity into image data of the input object 216. On the other hand, light beams 240 and 242, which have a larger angle from normal, strike the collimator filter layer 204, either on its top surface or at surface within the aperture (e.g., aperture sidewall) and are blocked and prevented from reaching optical sensing elements in the image sensor array 202.

A metric of the collimator filter layer 204 is an aspect ratio of the apertures or holes 220. The aspect ratio is the height of the holes (h) 244 in the collimator filter layer 204 divided by hole diameter (d) 246. The aspect ratio should be sufficiently large to prevent "stray" light from reaching the optical sensing elements directly under each collimator hole.

An example of stray light is light ray 242 reflected from portion 228 of the cover layer 210 (e.g., a valley), which would reach sensing elements underneath a ridge in the absence of the collimator filter layer. Larger aspect ratios restrict the light acceptance cone to smaller angles, improving the optical resolution of the system. The minimum aspect ratio can be estimated using a ratio of the distance from the collimator filter layer 204 to the object being imaged (e.g., finger) divided by the desired optical resolution of the finger. In some embodiments, the collimator apertures 220 are cylindrical or conical in shape. The sidewalls of the collimator apertures 220 may include grooves or other structures to prevent stray light from reflecting off the walls and reaching the optical sensing elements. The effective aspect ratio is determined by the average hole diameter along the height of the collimator holes. Examples of suitable aspect ratios are ratios in the range of about 3:1 to 100:1 and more typically in the range of about 5:1 to 20:1.

It is generally desirable to make the height 244 of the collimator apertures 220 as thin as possible to provide the most flexibility for fabricating the collimator filter layer 204 and integrating it with the underlying image sensor array 202, such as a CMOS or CCD image sensor. A small aperture diameter 246 may be used to maintain the desired collimator aspect ratio. However, if the aperture is made too small (less than a few times the wavelength of light being used), diffraction effects can contribute to additional blurring as the light rays exiting the collimator apertures 220 diverge. Such diffraction effects can be mitigated by placing the collimator filter layer 204 as close to the image sensor array 202 as possible, ideally much closer than the Fraunhofer far field distance ($r^2$/lambda, where r is the aperture radius and lambda is the light wavelength).

It is also generally desirable to minimize the distance between the collimator filter layer 204 and the image sensor array 202 to allow the light reaching the optical sensing elements of the image sensor array 202 to be as concentrated as possible. In addition, if this sensor array 202 to collimator filter layer 204 distance is too large, stray light from adjacent holes may reach a particular optical sensing element, contributing to image blurring.

If the optical sensing element pitch (distance between elements) is smaller than the collimator hole pitch (distance between holes), the light passing through a single collimator aperture 220 may illuminate more than one optical sensing element. Such an arrangement is shown by optical sensing elements 234 and 236 in FIG. 4. In such cases, the processing system (FIG. 1) may combine the light intensity recorded by all the optical sensing elements corresponding to a given collimator aperture. The resulting fingerprint image after processing raw data from the image sensor array 202 may have a resolution corresponding to the array of collimator apertures. It will be noted that the arrangement of apertures 220 in the collimator filter layer 204 may result in some optical sensing elements in the sensor array 202 going unused. Examples of an unused optical sensing elements are sensing elements 245. Because optical sensing elements 245 are not underneath a collimator hole, reflected rays will be blocked before reaching them. Image processing may remove the unused sensor elements and scale the image appropriately before the data is used in image reconstruction or image matching, for example.

The imaging resolution (in dpi) of the optical sensor 200 is defined by the resolution of the apertures 220 in the collimator filter layer 204 whereas the pitch is the distance between each aperture. In the optical sensor device 200, each aperture 220 in the collimator filter layer 204 corresponds to a sample of a feature of the object 216 being imaged, such as a sample from a ridge or valley within a fingerprint. To maximize resolution, the sampling density (which is equal to the aperture density) should be large enough such that multiple samples are taken of each feature of interest. Thus, for example, to image ridges in a fingerprint, the pitch may be on the order of 50 to 100 microns ($\mu m$) since the pitch of the ridges themselves is on the order of 150 to 250 microns. If it desired to capture more granular features, such as pores in a fingerprint, a smaller pitch such as 25 microns would be appropriate. Conversely, a larger pitch can be used to capture larger features of the input object.

The optical sensor device 200 performs similarly over a wide range of distances between the collimator filter layer 204 and the sensing surface 220 because the filtering of reflected light is generally thickness independent, as long as the aspect ratio of the holes in the collimator filter layer 204 is chosen to support the desired optical resolution.

Figure 5:
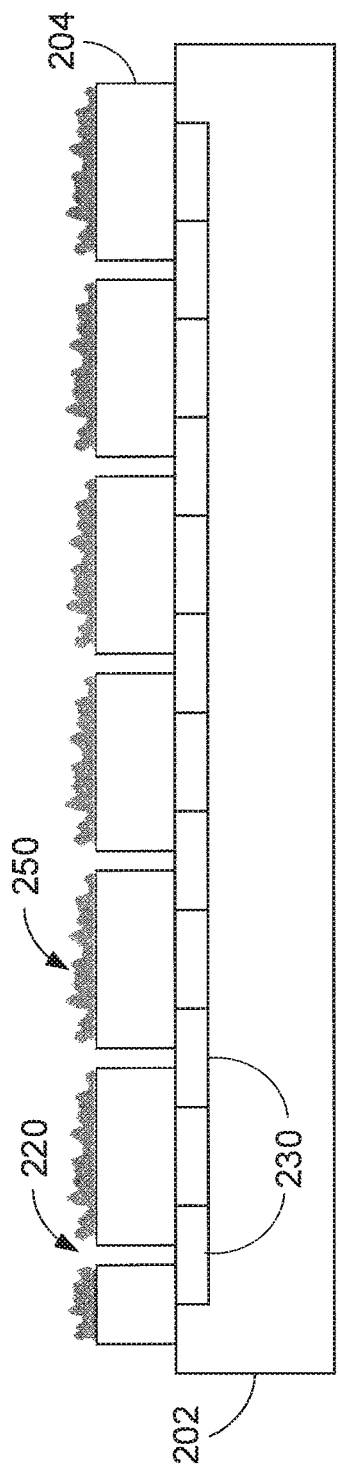
FIG. 5 illustrates an embodiment of a collimator filter layer according to an embodiment of the disclosure

FIG. 5 shows an alternative embodiment of the collimator filter layer 204. As described above, the collimator filter layer 204 is made of light-absorbing materials and includes an array of apertures 220. In the alternative embodiment shown, the top surface of the collimator filter layer 204 further includes a reflecting layer 250. The reflecting layer 250 allows light beams which would normally be absorbed by the collimator filter layer 204 to be reflected back upwards towards the sensing region. Redirecting the light back to the sensing region allows the reflected light to be recycled so that some of the recycled light can be reflected off the input object to be imaged and transmitted through the collimator filter layer apertures.

Inclusion of the reflecting layer 250 minimizes light loss by reflecting the stray light back to the input object 216 without requiring a high level of illumination in the overall sensor package. The reflecting layer 250 may be made of any suitable material that will reflect light such as aluminum, chromium, and silver to name a few examples. In an embodiment, the top of the light-absorbing collimator filter layer body may be roughened up using various texturizing techniques, including but not limited to, sandblasting, coating with fillers, UV embossing or dry etching, and this roughened-up top may then covered with the reflecting layer 250, e.g., a thin layer of metal, which creates a surface that is multifaceted in a randomized fashion. In another embodiment, the reflecting layer 250 may be formed on the collimator filter layer body and the reflecting layer 250 may be roughened up.

In yet another embodiment, the collimator filter layer 204 is replaced or supplemented with an optical interference filter that blocks "stray" light at angles of incidence that are relatively far from normal to the imaging plane. Multilayer optical filters can be used that transmit light at near normal incidence in much the same way such a filter can be constructed to only transmit light at specific wavelengths. Although such an angle-specific filter may be designed to work for specific light wavelengths, such an interference filter may be used to reject the stray light coming from adjacent ridges and valleys.

The collimator filter layer 204 may also be a transparent glass collimator filter with round openings on top and bottom. This type of collimator filter layer may be made using double-sided alignment technique to create top and bottom openings that are aligned, but without physically hollow holes through the glass body. The top surface of the collimator filter layer can be textured to be a diffuser for the light entering while the bottom surface can be metallic to recycle light by reflecting the light back to the transparent glass body. One of the advantages is that this method makes lamination simpler since there are no physically hollow apertures. With this glass collimator filter layer, cover glass, light guide film, and glass filter can be laminated with readily available lamination equipment.

In some embodiments, an opaque glass collimator filter with drilled apertures can be used. This is similar to the previously described collimator filter film. The manufacturing method may be the same, except for the fact that the body is glass. The aperture density is determined based on the required dpi.

Figure 6:
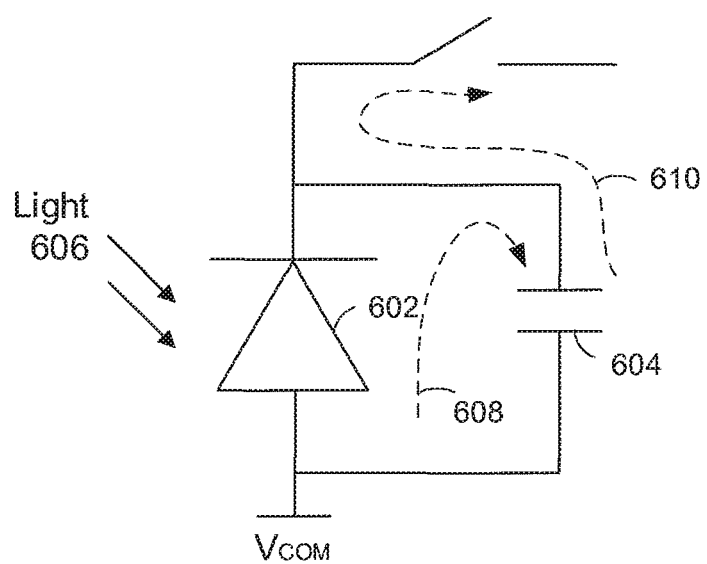
FIG. 6 is an example of a single sensing element, according to one embodiment.

FIG. 6 is an example of a single sensing element, according to one embodiment. For example, the sensing element may be a TFT sensor. The sensing element includes a reverse-biased diode 602 and a capacitor 604. As light is incident on the sensing element 600, current 608 flows through the diode 602 and is accumulated in the capacitor 604. A value of the stored charge can then be read-out 610 from the sensing element 600. After sensing, the sensing element can be reset by resetting the voltage $V_{COM}$ to a predefined value.

Figure 7:
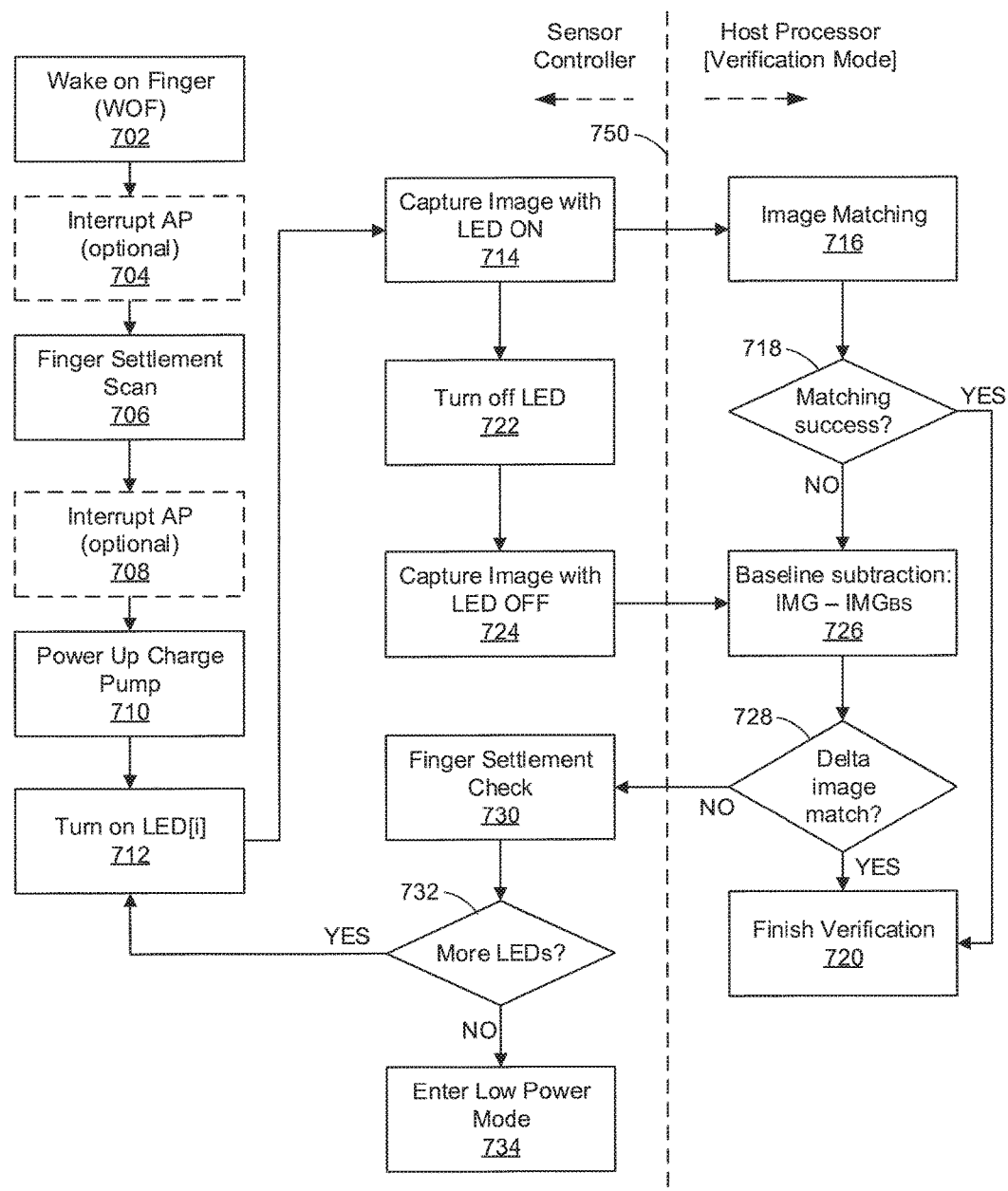
FIG. 7 illustrates a method for imaging, in accordance with one embodiment.

FIG. 7 illustrates a method for imaging, in accordance with one embodiment. In the embodiment shown in FIG. 7, the steps to the left of dashed line 750 are performed by a processor (e.g., controller) included in a sensor, and the steps to the right of dashed line 750 are performed by a host processor, such a CPU (central processing unit) of an electronic device, such as a phone.

In step 702, the controller included in the sensor determines the presence of an input object at the sensing surface, or so-called "wake-on-finger (WOF)." In some embodiments, the input object is a finger.

At step 704, the controller sends an interrupt to the host processor to wake the host processor. In some embodiments, step 704 is optional and is omitted. In some implementations, the host processor may be in a sleep mode to save power, and it may take some amount of time (e.g., 50-80 ms) to wake the host processor from sleep mode to an active state.

Depending on the use case, either power saving or reducing latency may have higher priority. If reducing latency is a priority, the controller sends an interrupt to the host processor (step 704) to wake the host processor, so that the host processor is awake and ready to execute a matching process once the controller transmits an image to the host processor to match. However, the host processor may therefore be ready "early," which consumes more power. However, if saving power is a priority, the controller may not send the interrupt to the host processor at step 704, and the host processor is awakened later, for example, just before processing, to save power at the expense of longer latency.

At step 706, the controller determines that the finger has settled on the sensing surface. As described above, conventional approaches to optical sensing may wait some number of frames before capturing an image of finger to minimize the chance that the finger has not yet settled. If the finger is not yet settled, the resultant image may be blurry.

Figure 8:
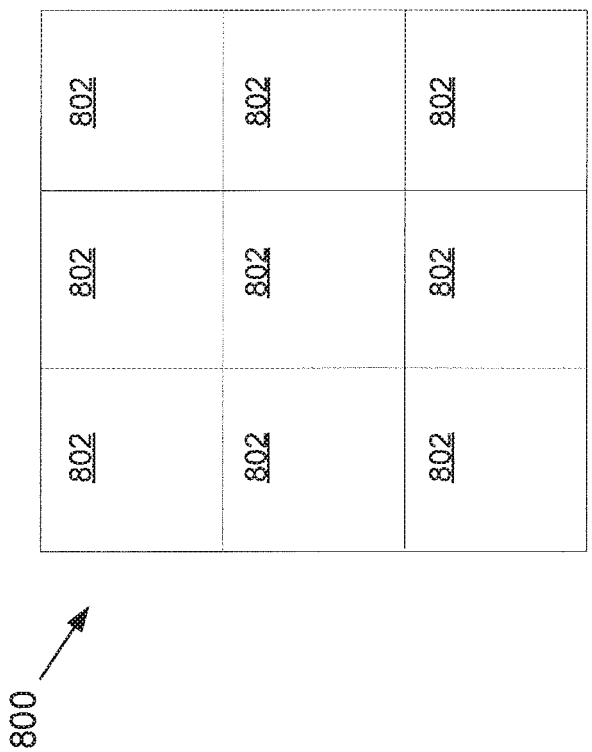
FIG. 8 is an example of a coarse sensor array, in one embodiment.

One embodiment for determining that the finger has settled on the sensing surface (step 706) is described in relation to FIG. 8 and FIGS. 9A-9C. In FIG. 8, a coarse sensor array 800 is divided into regions 802. As an example, the coarse sensor array 800 may be 9 mm×9 mm divided into nine regions (i.e., 3×3). In some example implementations, the regions may be about 1 to 5 mm×1 to 5 mm in size, e.g., 3 mm×3 mm. The size of the coarse sensor array 800 may vary in different embodiments, and the number of regions 802 may depend on the size of the coarse sensor array 800. In one embodiment, the coarse sensor array 800 is a capacitive sensor array and is arranged above the optical fingerprint sensor, e.g., TFT or CMOS sensor.

The coarse sensor array 800 divided into regions 802 provides a sensing result having a resolution that is coarser than the resolution of the optical fingerprint sensor, which provides more granular details, such as fingerprint ridges and valleys. To determine finger settlement, the coarse sensor array 800 is scanned at given time interval (e.g., 1-10 milliseconds) and the controller determines which of the regions 802 of the coarse sensor array 800 are covered by the finger. In some embodiments, if the number of pixels (regions 802) covered by the finger is changing less than certain threshold from one from to the next frame, then finger is considered to be stable or settled. The system may time-out if the finger is not determined to settle within a given amount of time.

FIG. 9A is an example stack-up of a sensor including a coarse sensor array 902 and an image sensor array 202. Similar to the stack-up shown in FIG. 3B, a display layer 320 comprising light sources 322 is disposed below a cover layer 210. A collimator filter layer 204 is disposed below the display layer 320. An image sensor array 202 is disposed below the collimator filter layer 204. As shown in FIG. 9A, a coarse sensor array 902 may be disposed between the display layer 320 and the collimator filter layer 204. As described, in one embodiment, the coarse sensor array 902 may be a capacitive sensor array; whereas, the image sensor array 202 is an optical sensor array, such as TFT or CMOS. The coarse sensor array 902 provides results at a coarser level of image resolution than the image sensor array 202.

In another embodiment, as shown in FIG. 9B, the coarse sensor array 902 may be disposed between the collimator filter layer 204 and the image sensor array 202.

In yet another embodiment, as shown in FIG. 9C, the coarse sensor array 902 may be disposed between the cover layer 210 and the display layer 320.

Referring back to FIG. 7, once the controller determines that the finger has settled at step 706, the controller sends, at step 708, an interrupt to the host processor to wake the host processor. In some embodiments, step 708 is optional and is omitted. Step 708 may be similar to step 704 described above and similar considerations are taken into account with respect to power savings and latency, depending on the use case. In one embodiment, step 708 can also be omitted if the host controller was awakened by an interrupt at step 704, since another interrupt is not necessary, as the host is already awakened.

At step 710, the controller powers up a charge pump, i.e., a power supply, for the optical fingerprint sensor. As described above, in a TFT implementation, a capacitor for each pixel accumulates charge from the incident light on the pixel.

At step 712, the controller turns on a light source, e.g., an LED, to illuminate the finger at the sensing region. In one embodiment, the sensing region is illuminated using an illumination layer having a light source and/or light guiding element. As previously described, this may be done by using a light source directing light into a separate light guiding element or by transmitting light directly into the cover layer. The transmitted light is directed towards a sensing region above the cover layer and reflected from an input object (e.g., finger) proximal the sensing region towards the light collimator layer. As also described, in some embodiments, the light source may be a display screen, and in other embodiments, a discrete light source separate from the display may be used. As such the light source that is turned on at step 712 may comprise one or more discrete light emitting elements (e.g., LEDs).

At step 714, the controller captures an image of the finger with the light source turned on. As described, some of the reflected light is blocked at the collimator filter layer while other light passes through apertures in the collimator filter layer and arrives at the optical fingerprint sensor. Generally, light rays at relatively near normal incidence to the collimator filter layer will pass through the apertures while light rays further from normal incidence will be blocked. Light may be blocked by the top surface of the collimator layer, an intermediate layer of the collimator, a bottom layer of the collimator, or sidewalls of the collimator aperture.

After the image is captured with the light source turned on, the controller of the sensor transmits the image to the host processor. At step 716, the host processor performs image matching to determine whether the image of the finger captured at step 714 matches to one or more enrollment image (i.e., template images) for the finger. In one embodiment, a default intensity value (i.e., baseline value) may be used for the ambient light and a certain value can be subtracted from the intensity value at each pixel location of the image of the finger captured at step 714 before matching is performed at step 718. In various embodiments, the default baseline may be set during manufacture or set during calibration. In some embodiments, the default baseline may be dynamic. For example, the default baseline may change as a function of temperature.

If, at step 718, a match is found within a given threshold, then the method proceeds to step 720, where the host processor finishes verification (i.e., finds successful match). There are many different implementations for performing image matching, each of which is within the scope of the present disclosure. If a match is found, various actions may be initiated depending on context, such for example unlocking a mobile phone.

Given the above workflow from steps 714-716-718-720, a successful fingerprint match is found without the need to capture a separate baseline image. However, as also shown in FIG. 7, after or in parallel with transmitting the image captured at step 714 to the host processor, the controller, at step 722, turns off the light source and, at step 724, captures an image of the finger with the light source turned off. The image captured at step 724 is transmitted from the controller to the host processor. If the matching was unsuccessful at step 718 (i.e., using the image captured at step 714), then the method proceeds to step 726, where the host processor computes baseline subtraction by subtracting, for each pixel location in the first and second images, an intensity value of the pixel in the image captured at step 724 ("IMGBs") from an intensity value of the pixel in the image captured at step 714 ("IMG") to generate a delta image. At step 728, the host processor performs image matching using the delta image. If a match is found using the delta image, the method proceeds to step 720, where the host processor finishes verification (i.e., finds a successful match).

If no match is found using the delta image at step 728, the method proceeds to step 730, where the controller performs a finger settlement check. At step 730, the controller determines whether the finger is still settled on the sensing region. Step 730 may be similar to step 706 described above.

At step 732, the controller determines whether any additional light sources remain that can be illuminated to illuminate the finger to capture the optically-sensed image. In some embodiments, different color LEDs may be used for optical sensing, for example, for anti-spoofing purposes. Anti-spoofing, also called "liveness detection," refers to detecting whether the input object is a real or "live" finer, as opposed to a fake finger made of some other material, such as word, rubber, epoxy, etc. For example, in embodiments where the light source is part of the display, the display may comprises red, blue, and green LEDs. A first light source that is turned on at step 712 may comprise the red LEDs, and further light sources that can be illuminated comprise (a) the blue LEDS, and (b) the green LEDs.

Also, in some embodiments, multiple LEDs may be arranged at different locations around the sensing region to provide light at slightly different angles to illuminate the finger.

If at step 732, the controller determines that there are no additional light sources to illuminate the finger, then the method proceeds to step 734, where the controller causes the sensor and/or the electronic device to enter low power mode. In this case, no match was found.

If at step 732, the controller determines that there are additional light sources to illuminate the finger, then the method returns to step 712, where the controller illuminates a different light source that has not yet been illuminated. The remaining steps previously described above in FIG. 7 are repeated for the additional light source. In some embodiments, the controller may cycle through the plurality of available light sources one or more times to illuminate the finger before determining that there is no match and entering low power mode.

As such, in the disclosed scan sequence, the second image (i.e., captured with the light source turned off) is not needed if a match can be found based on the first image (i.e., captured with the light source turned on). As such, latency is improved since the system does not need to wait for the second image to be captured to begin the match verification process. In some implementations, the second image may be used in very bright lighting environments (e.g., direct sunlight), but may not be necessary to find a match is most other lighting environments.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Example embodiments are described herein. Variations of those embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. For example, although generally described for use as a biometric sensor, the described arrangement may be used to image any form of an input object. Moreover, any combination of the above-described elements in all possible variations thereof is encompassed by the invention unless otherwise indicated herein or otherwise clearly contradicted by context.

The invention claimed is:

1. An imaging device included in an electronic device for imaging an input object, the imaging device comprising:
    a light source that emanates light to a sensing region in which the input object to be imaged is placed;
    a collimator filter layer;
    an image sensor array disposed below the collimator filter layer, wherein the collimator filter layer blocks some light reflected from the input object while other light reflected from the input object passes through apertures in the collimator filter layer and arrives at the image sensor array; and
    a controller configured to cause a first image of the input object to be captured with the light source turned on, and to transmit the first image to a processor associated with the electronic device to perform image matching against one or more template images before causing a second image of the input object to be captured with the light source turned off.

2. The imaging device of claim 1, further comprising: a coarse sensor array, wherein the controller is further configured to determine that the input object has settled in the sensing region before causing the first image of the input object to be captured with the light source turned on.

3. The imaging device of claim 2, wherein determining that the input object has settled comprises determining that a number of regions of the coarse sensor array that is covered by the input object in a first frame is within a threshold of a number of regions of the coarse sensor array that is covered by the input object in a second frame that is after the first frame.

4. The imaging device of claim 2, wherein the image sensor array is an optical sensor array and the coarse sensor array is a capacitive sensor array, wherein the coarse sensor array has a coarser image resolution than the image resolution of the image sensor array.

5. The imaging device of claim 2, wherein the controller is configured to send an interrupt to the processor is response to determining that the input object has settled in the sensing region, wherein the interrupt is configured to wake the processor.

6. The imaging device of claim 1, wherein the controller is further configured to:
    determine presence of the input object in the sensing region before determining that the input object has settled in the sensing region; and
    send an interrupt to the processor is response to determining the presence of the input object in the sensing region, wherein the interrupt is configured to wake the processor.

7. The imaging device of claim 1, wherein performing image matching comprises subtracting, for each pixel location in the first image, a default intensity value from an intensity value of the pixel in the first image, and performing image matching using a resultant image of the subtracting, for each pixel location in the first image, the default intensity value from the intensity value of the pixel in the first image.

8. The imaging device of claim 1, wherein the controller is configured to:
    cause a second image of the input object to be captured with the light source turned off and
    transmit the second image to the processor associated with the electronic device to perform image matching based on the first image and the second image.

9. The imaging device of claim 8, wherein performing image matching based on the first image and the second image comprises subtracting, for each pixel location in the first and second images, an intensity value of the pixel in the second image from a corresponding intensity value of the pixel in the first image to generate a delta image, and performing image matching using the delta image.

10. The imaging device of claim 1, wherein the light source comprises light emitting diodes included as part of a display of the electronic device.

11. A method for imaging an input object, the method comprising:
    determining that the input object has settled in a sensing region associated with an electronic device;
    causing a first image of the input object to be captured with a light source turned on, wherein light emanating from the light source is reflected from the input object, and wherein some light reflected from the input object is blocked by a collimator filter layer while other light reflected from the input object passes through apertures in the collimator filter layer and arrives at an image sensor array that captures the first image of the input object; and
    transmitting the first image to a processor associated with the electronic device to perform image matching against one or more template images before causing a second image of the input object to be captured with the light source turned off.

12. The method of claim 11, wherein causing the first image of the input object to be captured with the light source turned on is performed in response to determining that the input object has settled in the sensing region.

13. The method of claim 12, wherein the electronic device includes a coarse sensor array, and wherein determining that the input object has settled in the sensing region comprises determining that a number of regions of the coarse sensor array that is covered by the input object in a first frame is within a threshold of a number of regions of the coarse sensor array that is covered by the input object in a second frame that is after the first frame.

14. The method of claim 13, wherein the image sensor array is an optical sensor array and the coarse sensor array is a capacitive sensor array, and wherein the coarse sensor array has a coarser image resolution than the image resolution of the image sensor array.

15. The method of claim 11, further comprising:
sending an interrupt to the processor is response to determining that the input object has settled in the sensing region, wherein the interrupt is configured to wake the processor.

16. The method of claim 11, wherein performing image matching comprises subtracting, for each pixel location in the first image, a default intensity value from an intensity value of the pixel in the first image, and performing image matching using a resultant image of the subtracting, for each pixel location in the first image, the default intensity value from the intensity value of the pixel in the first image.

17. The method of claim 11, further comprising:
causing a second image of the input object to be captured with the light source turned off; and
transmitting the second image to the processor associated with the electronic device to perform image matching based on the first image and the second image.

18. The method of claim 17, wherein performing image matching based on the first image and the second image comprises subtracting, for each pixel location in the first and second images, an intensity value of the pixel in the second image from a corresponding intensity value of the pixel in the first image to generate a delta image, and performing image matching using the delta image.

19. A non-transitory computer-readable storage medium storing instructions that, when executed by a processor, cause an electronic device to image an input object, by performing the steps of:
determining that the input object has settled in a sensing region associated with the electronic device;
causing a first image of the input object to be captured with a light source turned on, wherein light emanating from the light source is reflected from the input object, and wherein some light reflected from the input object is blocked by a collimator filter layer while other light reflected from the input object passes through apertures in the collimator filter layer and arrives at an image sensor array that captures the first image of the input object; and
transmitting the first image to a processor associated with the electronic device to perform image matching against one or more template images before causing a second image of the input object to be captured with the light source turned off.

20. The computer-readable storage medium of claim 19, wherein the electronic device includes a coarse sensor array, and wherein determining that the input object has settled in the sensing region comprises determining that a number of regions of the coarse sensor array that is covered by the input object in a first frame is within a threshold of a number of regions of the coarse sensor array that is covered by the input object in a second frame that is after the first frame.

* * * * *